(12) United States Patent
Melakari et al.

(10) Patent No.: US 11,023,041 B1
(45) Date of Patent: Jun. 1, 2021

(54) SYSTEM AND METHOD FOR PRODUCING IMAGES BASED ON GAZE DIRECTION AND FIELD OF VIEW

(71) Applicant: Varjo Technologies Oy, Helsinki (FI)

(72) Inventors: Klaus Melakari, Oulu (FI); Urho Konttori, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/676,517

(22) Filed: Nov. 7, 2019

(51) Int. Cl.
| | |
|---|---|
| *G06F 3/01* | (2006.01) |
| *G06T 19/00* | (2011.01) |
| *H04N 5/235* | (2006.01) |
| *G06T 3/40* | (2006.01) |
| *H04N 5/262* | (2006.01) |
| *H04N 7/01* | (2006.01) |
| *G06T 7/20* | (2017.01) |

(52) U.S. Cl.
CPC ............. *G06F 3/013* (2013.01); *G06F 3/012* (2013.01); *G06T 3/40* (2013.01); *G06T 7/20* (2013.01); *G06T 19/006* (2013.01); *H04N 5/2353* (2013.01); *H04N 5/2628* (2013.01); *H04N 7/0127* (2013.01); *G06T 2207/10016* (2013.01); *G06T 2207/20132* (2013.01)

(58) Field of Classification Search
CPC ....... G06F 3/013; G06F 3/012; G06T 19/006; G06T 3/40; G06T 7/20; G06T 2207/10016; G06T 2207/20132; G06T 7/70; H04N 5/2353; H04N 7/0127; H04N 5/2628; G02B 27/017; G02B 2027/0138; G06K 9/00671
See application file for complete search history.

(56) References Cited

U.S. PATENT DOCUMENTS

| | | | | |
|---|---|---|---|---|
| 8,824,730 | B2 * | 9/2014 | Jouppi | H04N 5/23238 382/103 |
| 8,831,798 | B1 * | 9/2014 | Barber | G01C 21/00 701/10 |
| 10,027,873 | B2 * | 7/2018 | Brav | H04N 5/23296 |
| 2013/0141523 | A1 * | 6/2013 | Banta | H04N 21/47202 348/36 |
| 2015/0227196 | A1 * | 8/2015 | Fujii | G06T 11/60 345/156 |
| 2015/0379772 | A1 * | 12/2015 | Hoffman | G06T 19/006 345/633 |
| 2017/0111636 | A1 * | 4/2017 | Hasegawa | G06T 7/285 |
| 2018/0192001 | A1 * | 7/2018 | Boyce | H04N 19/167 |
| 2019/0387168 | A1 * | 12/2019 | Smith | G06F 3/0304 |
| 2020/0322696 | A1 * | 10/2020 | Dvir | H04N 13/279 |

* cited by examiner

*Primary Examiner* — Albert H Cutler
(74) *Attorney, Agent, or Firm* — Ziegler IP Law Group, LLC (57) ABSTRACT

A system for producing images for a display apparatus. The system includes image source(s) and processor. The processor is configured to obtain information indicative of angular size of field of view providable by image renderer of display apparatus; obtain information indicative of gaze direction of user; receive sequence of images from image source(s); and process sequence of images to generate sequence of processed images. When processing sequence of images, processor is configured to crop a given image, based on gaze direction of user and angular size of field of view, to generate processed image. Angular size of field of view represented by processed image is larger than angular size of field of view providable by the image renderer.

18 Claims, 5 Drawing Sheets

SYSTEM AND METHOD FOR PRODUCING IMAGES BASED ON GAZE DIRECTION AND FIELD OF VIEW

TECHNICAL FIELD

The present disclosure relates generally to systems for producing images; and more specifically, to systems for producing images for display apparatuses, said systems comprising image sources and processors. Moreover, the present disclosure also relates to methods of producing images for display apparatuses. Furthermore, the present disclosure relates to computer program products comprising non-transitory machine-readable data storage media having stored thereon program instructions that, when accessed by processing devices, execute the aforementioned methods.

BACKGROUND

Presently, several technologies (for example, such as virtual reality (VR), augmented reality (AR), mixed reality (MR) and extended reality (XR)) are being used to present interactive simulated environments to users. Typically, the users utilize specialized devices (for example, such as a virtual reality device, an augmented reality device, a mixed reality device, an extended reality device, and the like) for experiencing and interacting with such simulated environments. In use, the user generally wears (namely, supports) the specialized device on his/her head. Moreover, the user moves his/her head to 'look around' within the simulated environment.

Such conventional specialized devices obtain images from conventional image sources. However, these image sources have certain limitations associated therewith. Since the images are often large in size and have high resolution, the conventional image sources require very high bandwidth to communicate the images to the specialized devices. This limits a data throughput of a communication network between the image sources and the specialized devices. Nowadays, the image sources communicate images having a size corresponding to a viewport of the specialized devices, to the specialized devices. However, this approach introduces very strict latency requirements and sequential preferencing to match a high framerate of the specialized devices. In an example, the framerate may be more than 90 frames per second. Such a high framerate leads to very high bandwidth requirements and poor low light performance. As a result, the user's experience of immersiveness within the simulated environment is adversely affected.

Therefore, in light of the foregoing discussion, there exists a need to overcome the aforementioned drawbacks associated with conventional equipment for providing images for specialized devices.

SUMMARY

The present disclosure seeks to provide a system for producing images for a display apparatus. The present disclosure also seeks to provide a method of producing images for a display apparatus. The present disclosure seeks to provide a computer program product comprising non-transitory machine-readable data storage medium having stored thereon program instructions that, when accessed by processing device executes the aforementioned method. The present disclosure seeks to provide a solution to the existing problem of high framerate and high bandwidth requirements associated with conventional equipment that is employed for providing images for specialized devices. An aim of the present disclosure is to provide a solution that overcomes at least partially the problems encountered in prior art, and provides a reliable and efficient system for producing images for a display apparatus, said system employing specialized processing of images obtained from image sources.

In one aspect, an embodiment of the present disclosure provides a system for producing images for a display apparatus, the system comprising at least one image source, and a processor communicably coupled to the at least one image source, wherein the processor is configured to:

obtain information indicative of an angular size of a field of view providable by at least one image renderer of the display apparatus;

obtain information indicative of a gaze direction of a user;

receive a sequence of images from the at least one image source; and process the sequence of images to generate at least one sequence of processed images to be communicated to the display apparatus, wherein, when processing the sequence of images, the processor is configured to crop a given image, based on the gaze direction of the user and the angular size of the field of view providable by the at least one image renderer, to generate at least one processed image, an angular size of a field of view represented by the at least one processed image being larger than the angular size of the field of view providable by the at least one image renderer of the display apparatus.

In another aspect, an embodiment of the present disclosure provides a method of producing images for a display apparatus, the method comprising:

obtaining information indicative of an angular size of a field of view providable by at least one image renderer of the display apparatus;

obtaining information indicative of a gaze direction of a user;

receiving a sequence of images from at least one image source; and processing the sequence of images to generate at least one sequence of processed images to be communicated to the display apparatus, wherein the step of processing the sequence of images comprises cropping a given image, based on the gaze direction of the user and the angular size of the field of view providable by the at least one image renderer, to generate at least one processed image, an angular size of a field of view represented by the at least one processed image being larger than the angular size of the field of view providable by the at least one image renderer of the display apparatus.

In yet another aspect, an embodiment of the present disclosure provides a computer program product comprising a non-transitory machine-readable data storage medium having stored thereon program instructions that, when accessed by a processing device, cause the processing device to:

obtain information indicative of an angular size of a field of view providable by at least one image renderer of a display apparatus;

obtain information indicative of a gaze direction of a user;

receive a sequence of images from at least one image source; and process the sequence of images to generate at least one sequence of processed images to be communicated to the display apparatus, wherein, when processing the sequence of images, the program instructions cause the processing device to crop a given image, based on the gaze direction of the user and the angular size of the field of view providable by the at least one image renderer, to generate at least one processed image, an angular size of a field of view represented by the at least one processed image being larger than the angular size of the field of view providable by the at least one image renderer of the display apparatus.

Embodiments of the present disclosure substantially eliminate or at least partially address the aforementioned problems in the prior art, and enables production of realistic images by the system, for the display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for producing images for a display apparatus, the system comprising at least one image source, and a processor communicably coupled to the at least one image source, wherein the processor is configured to:

obtain information indicative of an angular size of a field of view providable by at least one image renderer of the display apparatus;

obtain information indicative of a gaze direction of a user;

receive a sequence of images from the at least one image source; and process the sequence of images to generate at least one sequence of processed images to be communicated to the display apparatus, wherein, when processing the sequence of images, the processor is configured to crop a given image, based on the gaze direction of the user and the angular size of the field of view providable by the at least one image renderer, to generate at least one processed image, an angular size of a field of view represented by the at least one processed image being larger than the angular size of the field of view providable by the at least one image renderer of the display apparatus.

In another aspect, an embodiment of the present disclosure provides a method of producing images for a display apparatus, the method comprising:

obtaining information indicative of an angular size of a field of view providable by at least one image renderer of the display apparatus;

obtaining information indicative of a gaze direction of a user;

receiving a sequence of images from at least one image source; and processing the sequence of images to generate at least one sequence of processed images to be communicated to the display apparatus, wherein the step of processing the sequence of images comprises cropping a given image, based on the gaze direction of the user and the angular size of the field of view providable by the at least one image renderer, to generate at least one processed image, an angular size of a field of view represented by the at least one processed image being larger than the angular size of the field of view providable by the at least one image renderer of the display apparatus.

In yet another aspect, an embodiment of the present disclosure provides a computer program product comprising a non-transitory machine-readable data storage medium having stored thereon program instructions that, when accessed by a processing device, cause the processing device to:

obtain information indicative of an angular size of a field of view providable by at least one image renderer of a display apparatus;

obtain information indicative of a gaze direction of a user;

receive a sequence of images from at least one image source; and process the sequence of images to generate at least one sequence of processed images to be communicated to the display apparatus, wherein, when processing the sequence of images, the program instructions cause the processing device to crop a given image, based on the gaze direction of the user and the angular size of the field of view providable by the at least one image renderer, to generate at least one processed image, an angular size of a field of view represented by the at least one processed image being larger than the angular size of the field of view providable by the at least one image renderer of the display apparatus.

The present disclosure provides the aforementioned system, the aforementioned method, and the aforementioned computer program product. The at least one image source of such a system easily adapts to latency requirements and varying framerate requirements of the display apparatus. Beneficially, the system meets bandwidth limitations and data throughput limitations of a communication network between the processor of the system and the display apparatus. The system significantly reduces an amount of power required to communicate the generated sequence of processed images to the display apparatus. Moreover, the method described herein is computationally efficient and simple.

Throughout the present disclosure, the term "system" refers to specialized equipment that is configured to produce images for the display apparatus. It will be appreciated that the system produces said images in real time or near real time.

Throughout the present disclosure, the term "image source" refers to equipment that is configured to provide the sequence of images to the processor, wherein the sequence of images are to be used for producing the images for the display apparatus. Different embodiments pertaining to different implementations of the at least one image source are described herein later.

Throughout the present disclosure, the term "processor" refers to hardware, software, firmware or a combination of these. The processor controls operation of the system. The processor is communicably coupled to the at least one image source wirelessly and/or in a wired manner. By way of such coupling, the processor obtains the sequence of images from the at least one image source. As an example, the system may be mounted on a robot in a manner that the at least one image source is mounted on an outer surface of the robot, whereas the processor is mounted inside a body of the robot. In such an example, the processor may be wirelessly coupled to the at least one image source.

Throughout the present disclosure, the term "display apparatus" refers to specialized equipment that is configured to present a simulated environment to the user when the display apparatus in operation is worn by the user on his/her head. In such an instance, the display apparatus acts as a device (for example, such as a virtual reality headset, a pair of virtual reality glasses, an augmented reality headset, a pair of augmented reality glasses, a mixed reality headset, a pair of mixed reality glasses, an extended reality headset, a pair of extended reality glasses, and the like) that is operable to present a visual scene of the simulated environment to the user. The display apparatus may also commonly be referred to as "head-mounted display apparatus".

Notably, the system is communicably coupled to the display apparatus. By way of such communicable coupling, the system transmits the sequence of images to the display apparatus. In some implementations, the system is integrated with the display apparatus. In such implementations, the system is physically coupled to the display apparatus (for example, attached via mechanical and electrical connections to components of the display apparatus). In other implementations, the system is implemented on a remote device that is separate from the display apparatus. In such implementations, the system and the display apparatus are communicably coupled via a wired communication interface or a wireless communication interface. Optionally, the system is mounted on the remote device. Examples of the remote device include, but are not limited to, a drone, a vehicle, and a robot. In such an instance, the remote device is physically positioned at a real-world environment, whereas the user of the display apparatus is positioned away from (for example, at a distance from) the remote device.

It will be appreciated that the processor of the system is at least coupled in communication with the display apparatus. Optionally, the processor is coupled in communication with a processing unit of the display apparatus. Herein, the term "processing unit" refers to hardware, software, firmware or a combination of these, that controls operation of the display apparatus. Optionally, the processor is coupled in communication with the at least one image renderer of the display apparatus.

Throughout the present disclosure, the term "image renderer" refers to equipment that, in operation, renders images that are to be shown to the user of the display apparatus. Optionally, the at least one image renderer is implemented as at least one display. Optionally, the at least one image renderer is implemented as at least one projector. In this regard, the images are projected (by the at least one projector) onto a projection screen or directly onto a retina of the user's eyes. It will be appreciated that the term "at least one image renderer" refers to "one image renderer" in some implementations, and "a plurality of image renderers" in other implementations.

Throughout the present disclosure, the phrase "angular size of the field of view providable by the at least one image renderer" refers to an angular size (namely, an angular extent) of a given image that can be rendered at the at least one image renderer. Notably, the angular size of the field of view providable by the at least one image renderer is measured with respect to the user's eye or an imaginary point from where the user would apparently view the given image rendered by the at least one image renderer.

It will be appreciated that the angular size of the field of view providable by the at least one image renderer is fixed (namely, constant). Notably, said angular size is defined by physical attributes of the at least one image renderer, and is known for a given model and type of the display apparatus. Therefore, the information indicative of the angular size of the field of view providable by the at least one image renderer is obtained only once for a given display apparatus.

Moreover, it will also be appreciated that the angular size of the field of view providable by the at least one image renderer corresponds to an angular size of a field of view providable by a viewport of the display apparatus. Herein, the term "viewport" refers to an area of the display apparatus that is employed for displaying the given image.

Optionally, the information indicative of the angular size of the field of view providable by the at least one image renderer is obtained from a data repository at which information indicative of angular sizes of fields of view providable by image renderers for various models and types of display apparatuses is stored. Optionally, in this regard, the processor is communicably coupled to the data repository. The term "data repository" refers to hardware, software, firmware, or a combination of these for storing a given information in an organized (namely, structured) manner, thereby, allowing for easy storage, access (namely, retrieval), updating and analysis of the given information.

Optionally, the information indicative of the gaze direction of the user is obtained from separate sources. Alternatively, optionally, the information indicative of the gaze direction of the user is obtained from a single source.

Optionally, the information indicative of the gaze direction of the user is obtained from a means for detecting the gaze direction of the user. Optionally, in this regard, the processor is communicably coupled to the means for detecting the gaze direction of the user. Throughout the present disclosure, the term "means for detecting the gaze direction" refers to specialized equipment for detecting and/or following a direction of gaze of the user of the display apparatus. Notably, the gaze direction of the user is detected when the display apparatus in operation is worn by the user. Optionally, the means for detecting the gaze direction is implemented by way of contact lenses with sensors, cameras monitoring the position of the pupil of the user's eye, and the like. Such means for detecting the gaze direction are well-known in the art. Beneficially, the means for detecting the gaze direction is arranged in a manner that said means does not cause any obstruction in an optical path of a projection of the given image (that is to be shown to the user). It is to be understood that the means for tracking the gaze direction may also be referred to as an "eye-tracker system", a "gaze-tracking system" or a "means for tracking the gaze direction".

Optionally, the display apparatus comprises the means for detecting the gaze direction of the user. Additionally or alternatively, optionally, the means for detecting the gaze direction of the user is implemented as an external gaze tracking system arranged within the real-world environment, wherein the external gaze tracking system monitors markers attached to the display apparatus or pupils of the user's eyes for determining the gaze direction of the user. Optionally, when the external gaze tracking system monitors markers attached to the display apparatus, the external gaze tracking system comprises at least one marker monitoring module, said at least one marker monitoring module being implemented as at least one of: an infrared camera, a visible light camera.

It will be appreciated that the information indicative of the gaze direction of the user is obtained repeatedly for a given display apparatus as the user's gaze keeps changing whilst he/she uses the display apparatus. An up-to-date information indicative of the gaze direction allows for producing up-to-date gaze contingent images for the display apparatus.

The processor receives the sequence of images from the at least one image source. Optionally, the processor is configured to transmit a request for receiving the sequence of images to the at least one image source, and the at least one image source is configured to transmit the sequence of images to the processor upon receipt of said request. Alternatively, optionally, the at least one image source is configured to automatically transmit the sequence of images to the processor.

The sequence of images is processed to generate the at least one sequence of processed images to be communicated to the display apparatus. Herein, the term "processed image" refers to an image that is generated upon processing the given image. The at least one sequence of processed images is communicated to the display apparatus for being used at the display apparatus.

Notably, when processing the sequence of images, the processor crops the given image, based on the gaze direction of the user and the angular size of the field of view providable by the at least one image renderer, to generate the at least one processed image. The processor maps the detected gaze direction of the user to the given image to determine a region of the given image at which the user is gazing. Said region of the given image is to be cropped to generate the at least one processed image. The angular size of the field of view represented by the at least one processed image is selected to be larger than the angular size of the field of view providable by the at least one image renderer of the display apparatus.

Optionally, the angular size of the field of view represented by the at least one processed image lies in a range of 100 percent to 400 percent of the angular size of the field of view providable by the at least one image renderer of the display apparatus. The angular size of the field of view represented by the at least one processed image may, for example, be from 100, 125, 150, 175, 200, 225, 250, 275, 300, 325, 350 or 375 percent of the angular size of the field of view providable by the at least one image renderer up to 125, 150, 175, 200, 225, 250, 275, 300, 325, 350, 375 or 400 percent of the angular size of the field of view providable by the at least one image renderer.

In some implementations, optionally, the angular size of the field of view represented by the at least one processed image lies in a range of 90 percent to 100 percent of the angular size of the field of view providable by the at least one image renderer of the display apparatus. In such a case, the processing unit of the display apparatus is configured to digitally add extra pixels on a periphery of a given image to be rendered by the at least one image renderer to compensate for possible change in the gaze direction of the user.

Herein, the phrase "angular size of the field of view represented by the at least one processed image" refers to an angular size (namely, an angular extent) of a region of an environment represented in the at least one processed image, said angular size being measured with respect to the user's eye or an imaginary point from where the user would apparently view the at least one processed image. Since the angular size of the field of view represented by the at least one processed image is larger than the angular size of the field of view providable by the at least one image renderer, an entirety of the at least one processed image would not be displayed at the at least one image renderer. In other words, the at least one image renderer, in operation, renders only a portion of the at least one processed image. For sake of simplicity, the portion of the at least one processed image that is to be rendered at the at least one image renderer is referred to as "at least one display image". It will be appreciated that the at least one image renderer, in operation, renders the at least one display image. The user uses the display apparatus to view the at least one display image.

It will be appreciated that when rendering the at least one display image, for small head movements of the user, a slightly different portion of the at least one processed image can be cropped and displayed to the user. Optionally, said cropping and displaying operations are performed by the processing unit of the display apparatus. Therefore, such small head movements are handled easily at the display apparatus. Notably, the at least one processed image is cropped from the given image. As a result, a size of the at least of the processed image in less as compared to a size of the given image. Therefore, the system easily meets the bandwidth constraints of the communication network as the at least one processed image requires less bandwidth to be transferred to the display apparatus as compared to the sequence of images. It will be appreciated that for a given bandwidth and a given time, more processed images can be communicated as compared to images of the sequence of images.

It will be appreciated that the at least one processed image is cropped to generate the at least one display image just before a required time instant of rendering the at least one display image at the at least one image renderer of the display apparatus. Therefore, latency requirements for communicating the at least one sequence of processed images to the display apparatus are not very critical.

Optionally, the processing unit of the display apparatus is configured to process the at least one sequence of processed images to generate at least one sequence of display images, wherein the at least one sequence of display images is to be rendered at the at least one image renderer of the display apparatus. Optionally, when processing the at least one sequence of processed images, the processor is configured to crop the at least one processed image to generate the at least one display image, based on the angular size of the field of view providable by the at least one image renderer. Specifically, the at least one sequence of display images is rendered at the display apparatus. An angular size of a field of view represented by the at least one display image is equal to or lesser than the angular size of the field of view providable by the at least one image renderer.

Optionally, when the angular size of the field of view represented by the at least one display image is equal to the angular size of the field of view providable by the at least one image renderer, the at least one display image is rendered by the at least one image renderer without any further processing. Alternatively, optionally, when the angular size of the field of view represented by the at least one display image is lesser than the angular size of the field of view providable by the at least one image renderer, the processing unit of the display apparatus performs at least one image processing operation for the at least one display image prior to rendering the at least one display image at the at least one image renderer. The at least one image processing operation may, for example, be digital addition of extra pixels on a periphery of the at least one display image.

According to an embodiment, the at least one image source is implemented as a data repository at which a plurality of images are stored, wherein a given image from amongst the plurality of images is:

previously captured by a camera,
previously generated using computer graphics, or
previously captured by a camera and further processed using computer graphics.

In this regard, the sequence of images is pre-stored at said data repository. Moreover, in such a case, the data repository acts as a database, whereas the processor acts as a server associated with the database. The data repository at which the plurality of images are stored may or may not be same as the data repository at which the information indicative of angular sizes of fields of view providable by image renderers for various models and types of display apparatuses is stored.

Optionally, when the given image from amongst the plurality of images is previously captured by the camera, the given image is representative of a real-world environment. In such a case, the given image is representative of at least one real-world object present in the real-world environment.

Optionally, when the given image from amongst the plurality of images is previously generated using computer graphics, the given image is representative of at least one virtual object (namely, at least one computer-generated object). Such a given image can be understood to be a computer graphics image (for example, such as an image of a virtual reality environment). The given image can be generated by any device that is configured to generate computer graphics images.

Optionally, when given image from amongst the plurality of images is previously captured by the camera and further processed using computer graphics, the given image is representative of at least one real-world object and at least one virtual object. Such a given image can be understood to be a hybrid image (for example, such as an augmented reality image or a mixed reality image) depicting both real-world and computer graphics constituents.

According to another embodiment, the at least one image source is implemented as at least one camera, and the processor is further configured to:

obtain information indicative of a head orientation of the user;

determine a change in the head orientation of the user relative to a previous head orientation of the user;

select adaptively a framerate to be employed for the at least one camera based on the change in the head orientation of the user; and adjust a three-dimensional orientation of the at least one camera, based on the head orientation of the user, and employ the selected framerate to capture the sequence of images, the sequence of images being representative of a real-world environment.

In this regard, the sequence of images is live streamed from the at least one camera to the processor. Throughout the present disclosure, the term "camera" refers to equipment that is operable to detect and process light from the real-world environment, so as to capture the sequence of images, wherein the sequence of images represents the real-world environment. Optionally, the at least one camera comprises a camera chip, wherein the light from the real-world environment is directed by at least one optical element of the at least one camera onto a photosensitive surface of the camera chip, thereby enabling the at least one camera to capture the sequence of images of the real-world environment.

It will be appreciated that the term "at least one camera" refers to "one camera" in some implementations, and "a plurality of cameras" in other implementations.

Optionally, the at least one camera is implemented as at least one of: a Red-Green-Blue (RGB) camera, a RGB-Depth (RGB-D) camera, a stereo camera, a plenoptic camera.

Optionally, the information indicative of the head orientation of the user is obtained from separate sources. Alternatively, optionally, the information indicative of the head orientation of the user is obtained from a single source.

Optionally, the information indicative of the head orientation of the user is obtained from a means for tracking the head orientation of the user. Optionally, in this regard, the processor is communicably coupled to the means for tracking the head orientation of the user. Throughout the present disclosure, the term "means for tracking the head orientation" refers to specialized equipment for detecting and/or following an orientation of the user's head, when the display apparatus is worn by the user. The means for tracking the head orientation is a three Degrees of Freedom (3DoF) tracking system or a six Degrees of Freedom (6DoF) tracking system. Moreover, the means for tracking the head orientation can be implemented as an inside-out tracking system or an outside-in tracking system.

Optionally, the display apparatus comprises the means for tracking the head orientation of the user. In such an instance, the means for tracking the head orientation is implemented as at least one of: an accelerometer, a gyroscope, an Inertial Measurement Unit (IMU). Additionally or alternatively, optionally, the means for tracking the head orientation of the user is implemented as an external head tracking system arranged within the real-world environment, wherein the external head-tracking system monitors markers attached to the display apparatus. Optionally, the external head tracking system comprises at least one marker monitoring module, said at least one marker monitoring module being implemented as at least one of: an infrared transceiver, a camera, a Radio Frequency Identification (RFID) Reader.

Optionally, when determining the change in the head orientation of the user relative to the previous head orientation of the user, the processor is configured to comparing a current head orientation of the user with a previously obtained head orientation of the user. Notably, the processor obtains the information indicative of the head orientation of the user repeatedly, and stores (at least temporarily, and optionally, permanently) said information at the data repository associated with the system. In this way, the processor has access to a record of at least one previously obtained head orientation of the user. It will be appreciated that when the user turns his/her head, the head orientation of the user relative to the previous head orientation of the user changes. Such a change in the head orientation of the user is determined based on comparing the current head orientation of the user with the previously obtained head orientation of the user.

In an example, the head orientation of the user at a first time instant may be straight. At a second time instant, the user may move his/her head sideways (for example, to a right side). The processor may determine this change in the head orientation of the user by comparing the head orientation of the user at the first time instant (which is pre-stored) with the head orientation of the user at the second time instant.

Optionally, a framerate to be employed for the at least one camera when the change in the head orientation of the user is substantial (namely, more) is different from a framerate to be employed for the at least one camera when the change in the head orientation of the user is minimal (namely, less). When the determined change in the head orientation of the user is less, the framerate can be adaptively lowered to be optimized according to requirements of the system, instead of requirements of the display apparatus. In such a case, the system is able to respond to human vestibular and visual system within a rendering framerate of the display apparatus. In such a case, a single image frame received from the system can be used to generate more than one image frame at the display apparatus in order to maintain the rendering framerate of the display apparatus. Such adaptive selection of the framerate to the employed for the at least one camera without impacting the rendering framerate of the display apparatus maintains the user's feeling of immersion within the simulated environment. Beneficially, employing a low framerate for the at least one camera is effective when the visual scene to be presented via the display apparatus contains semi-static content. For example, low framerates may be employed for the at least one camera while capturing images pertaining to visual scenes of industrial applications where most objects in the real-world environment are still and the head orientation of the user is relatively still.

Optionally, the processor is configured to adaptively select the framerate to be employed for the at least one camera, based on a predefined threshold value of the change in the head orientation of the user. Optionally, in this regard, when selecting adaptively the framerate to be employed for the at least one camera, the processor is configured to:

select a low framerate when the change in the head orientation of the user is smaller than or equal to the predefined threshold value;

select a high framerate when the change in the head orientation of the user is greater than the predefined threshold value.

Optionally, the predefined threshold value of the change in the head orientation of the user is a default value that is preset in the processor. Optionally, the predefined threshold value is determined based upon commonly known values of the change in the head orientation of a given user. Optionally, in this regard, the predefined threshold value is calculated based on the information indicative of the head orientation of the user, said information being stored at the data repository associated with the system.

Optionally, the three-dimensional orientation of the at least one camera is adjusted for capturing the sequence of images of the real-world environment from a perspective of the user. Such a three-dimensional orientation adjustment of the at least one camera beneficially accommodates for head movement(s) of the user while he/she experiences and interacts with the simulated environment using the display apparatus. This allows for enhancing realism within the simulated environment.

It will be appreciated that when the system is integrated with the display apparatus, the three-dimensional orientation of the at least one camera would be automatically adjusted upon movement of the user's head. However, when the system is implemented on the remote device, controlled physical adjustment of the three-dimensional orientation of the at least one camera would be beneficially employed to ensure that the sequence of images (that are representative of the real-world environment) are perspective-correct.

Optionally, the processor is configured to adjust the three-dimensional orientation of the at least one camera via at least one actuator. Throughout the present disclosure, the term "actuator" refers to equipment (for example, such as electrical components, mechanical components, magnetic components, polymeric components, and so forth) that is employed to adjust the three-dimensional orientation of the at least one camera, based on the head orientation of the user. The at least one actuator rotates and/or tilts the at least one camera to adjust the three-dimensional orientation of the at least one camera. Optionally, the at least one actuator adjusts the three-dimensional orientation of the at least one camera using an actuation signal (for example, such as an electric current, hydraulic pressure, and the like). More optionally, the processor controls the at least one actuator by generating the actuation signal for the at least one actuator.

In this regard, it will be appreciated that the at least one camera captures the sequence of images after the three-dimensional orientation of the at least one camera is properly adjusted according to the head orientation of the user. Whilst capturing the sequence of images, the at least one camera employs the selected framerate.

Optionally, when cropping the given image, the processor is configured to:

select a size of an area to be cropped out from the given image, based on a rate at which the head orientation of the user has changed; and/or select a location of an area to be cropped out from the given image, based on a direction in which the head orientation of the user has changed relative to the previous head orientation.

In this regard, a high rate of change of head orientation of the user is indicative of fast head movement of the user. In such a case, the user's perspective of the real-world environment changes rapidly. Therefore, the processor is optionally configured to select a large-sized area to be cropped out from the given image, in order to accommodate for the fast head movement of the user. Conversely, a low rate of change of head orientation of the user is indicative of slow head movement of the user. In such a case, the user's perspective of the real-world environment changes slowly. Therefore, the processor is optionally configured to select a small-sized area to be cropped out from the given image, in order to accommodate for the slow head movement of the user. It will be appreciated that even though the size of the area to be cropped out from the given image is selected according to the rate at which the head orientation of the user has changed, the size of the area to be cropped out from the given image is always greater than the angular size of the field of view providable by the at least one image renderer of the display apparatus. In some optional implementations, the size of the area to be cropped out from the given image is equal to or lesser than the angular size of the field of view providable by the at least one image renderer of the display apparatus.

Optionally, when cropping the given image to generate the at least one processed image, the processor is configured to select different sizes of the area to be cropped out from the given image to generate different sizes of the at least one processed image. In an example, the size of the area to be cropped out from the given image to generate the at least one processed image may be 200×200 pixels. In another example, the size of the area to be cropped out from the given image to generate the at least one processed image may be 500×500 pixels.

Optionally, the processor is configured to crop the given image to generate a plurality of processed images. Optionally, in this regard, the processor is configured to select differently-sized areas to be cropped out from the given image to generate differently-sized processed images.

Optionally, the size of the area to be cropped out from the given image is selected based on at least one of:
scene information,
whether or not an object of interest (namely, an object within the real-world environment at which the user is gazing) moves in the real-world environment,
how the object of interest moves.

In an example, the real-world environment may include three objects 'A', 'B' and 'C'. In such an example, the user may be gazing at the object 'B'. Therefore, the size of the area to be cropped out from the given image may be selected based on a size of the object 'B', in manner that an entirely of the object 'B' and its peripheral view is represented in the area that is to be cropped out from the given image.

In another example, the scene information may be indicative of an aerial view of a jungle including a dear and an eagle. In such an example, the size of the area to be cropped out from the given image can be selected based on the gaze direction of the user. In one case, the user may gaze at the trees present in the jungle. Notably, in such a case, the object of interest at which the user is gazing is the trees, which are still (namely, non-moving). Therefore, the size of the area to be cropped out from the given image is selected to correspond to a size of an area representing the trees. In another case, the user may gaze at the eagle flying over the jungle. Notably, in such a case, the object of interest at which the user is gazing is the eagle moving in a smooth manner. Therefore, the size of the area to be cropped out from the given image is selected to be slightly larger than a size of an area representing the eagle. In yet another case, the user may gaze at the deer moving in the jungle. Notably, in such a case, the object of interest at which the user is gazing is the deer moving in an irregular manner. Therefore, the size of the area to be cropped out from the given image is selected to be much larger than a size of an area representing the deer.

It will be appreciated that the head orientation of the user changes at least when:
the user moves his/her head to look at different objects within the visual scene,
the user moves his/her head according to a motion of a current object of interest.

Optionally, when the user moves his/her head in a manner that a current direction in which the user's head is oriented is different from the previous head orientation, the location of the area to be cropped out from the given image is correspondingly changed. This allows for ensuring that the at least one processed image generated upon such cropping conforms to a current perspective of the user. When such at least one processed image is further cropped to generate the at least one display image that is to be rendered at the at least one image renderer of the display apparatus, the at least one display image also conforms to the current perspective of the user. It will be appreciated that such a manner of selecting the location of the area to be cropped out from the given image is extremely beneficial in terms of providing the user with a feeling of realism and immersion within the visual scene.

In some cases, the location of the area to be cropped out from the given image is concentric with respect to the given image. In other cases, the location of the area to be cropped out from the given image may be offset with respect to the given image.

In an example, the previous head orientation of the user may be towards a central portion of a given image. As a result, a central portion of the given image may be cropped. Therefore, a location of the area to be cropped out from the given image is concentric with respect to the given image. In such an example, when the head orientation of the user changes from the previous head orientation of the user to a new head orientation of the user, a perspective of the user also changes. As a result, a new location of the area to be cropped out from the given image would change. As an example, a new head orientation of the user may be upwards. In such a case, the new location of the area to be cropped out from the given image corresponds to a top portion of the given image. Therefore, the new location of the area to be cropped out from the given image is offset with respect to the given image.

Optionally, the processor is configured to adjust an exposure time of the at least one camera based on the selected framerate. Notably, when the selected framerate is high, a required shutter speed of the at least one camera is also high. Upon using said required shutter speed, the exposure time of the at least one camera is adjusted to be low. On the other hand, when the selected framerate is low, a required shutter speed of the at least one camera is also low. Upon using said required shutter speed, the exposure time of the at least one camera is adjusted to be high. Beneficially, such a high exposure time improves low light performance of the at least one camera since it provides sufficient time for the at least one camera to capture the sequence of images in a dark real-world environment.

As an example, when the head orientation of the user changes, the system can adapt to said change by: reducing a resolution of the given image, increasing a framerate to be employed for capturing the sequence of images, and binning pixels of the given image together to maintain constant low-light sensitivity. It will be appreciated that the pixel binning operation allows for increasing the framerate of the at least one camera. Furthermore, such pixel binning facilitates reduction of noise within the captured sequence of images, and subsequently, within the at least one processed image. As a result, signal to noise ratio within the at least one processed image is improved. When the change in head orientation of the user stops, a resolution of the given image can be increased and the framerate can be decreased, thereby increasing the exposure time of the at least one camera.

Optionally, the processor is configured to:

process the sequence of images to detect motion in a visual scene represented by the sequence of images; and select adaptively a next framerate to be employed for the at least one camera, based on the motion detected in the visual scene and a next change in the head orientation of the user, to capture a next sequence of images of the real-world environment.

Optionally, the processor is configured to analyze visual content represented in the sequence of images to detect motion in the visual scene. As an example, the sequence of images may comprise 3 images S1, S2 and S3. An object (for example, such as a ball) may be shown fat position P1 in the image S1, at position P2 in the image S2, and at position P3 in the image S3. When the positions P1, P2 and P3 are different, upon analyzing the visual content in the images S1, S2 and S3, the processor detects motion of the object.

Optionally, the processor predicts the next change in the head orientation of the user based on the motion detected in the visual scene. Generally, when a given object within the visual scene is in motion, the user moves his/her head according to the motion of the given object. When the motion in the visual scene is known, the processor predicts the next change in the head orientation of the user to be along a direction of said motion. As an example, when motion of an object (for example, such as a rocket) in the visual scene is detected to be upwards, the processor may predict the next change in head orientation to be along the upward direction. In such a case, a predicted head orientation of the user may be one that is oriented above (namely, higher than) a current head orientation of the user.

In some cases, real objects within the visual scene are moving, while the user's head remains relatively still. In such a case, the next change in head orientation of the user may be substantial. Therefore, the next framerate to be employed for the at least one camera is selected such that the next framerate is higher than a current framerate.

In other cases, the real objects within the visual scene are still (for example, the real objects may be large equipment within an industrial plant), while the user's head remains relatively still. In such a case, the next change in head orientation of the user may be minimal. Therefore, the next framerate to be employed for the at least one camera is selected such that the next framerate is lower than the current framerate.

In yet other cases, both the real objects within the visual scene as well as the user's head are moving. In such a case, the next change in head orientation of the user may be substantial. Therefore, the next framerate to be employed for the at least one camera is selected such that the next framerate higher than the current framerate.

In still other cases, the real objects within the visual scene are still while the user's head is moving. Therefore, the next framerate to be employed for the at least one camera is selected such that the next framerate is higher than the current framerate.

It will be appreciated that optionally adaptively selecting the next framerate for capturing the next sequence of images allows for predictively maintaining the user's feeling of immersion within the simulated environment.

Optionally, the at least one image renderer comprises a first image renderer and a second image renderer, and the at least one sequence of processed images comprises a first sequence of processed images and a second sequence of processed images, wherein, when processing the sequence of images, the processor is configured to:

determine a region of interest of a given image, based on the gaze direction of the user;

generate a first processed image corresponding to the region of interest of the given image or a part of the region of interest, wherein an angular size of a field of view represented by the first processed image is larger than an angular size of a field of view providable by the first image renderer of the display apparatus; and generate a second processed image corresponding to at least a region of the given image that includes and surrounds the region of interest, wherein an angular size of a field of view represented by the second processed image is larger than an angular size of a field of view providable by the second image renderer of the display apparatus, and wherein a resolution of the second processed image is lower than a resolution of the first processed image.

Optionally, in this regard, the at least one image renderer is implemented as a Fovea Contingent Display (FCD) that, in operation, renders a foveated visual scene of the simulated environment. Optionally, the first image renderer has a first display resolution and the second image renderer has a second display resolution, the first display resolution being higher than the second display resolution. It will be appreciated that the FCD is designed to imitate a physiology of human vision. The FCD allows for increasing immersion and realism within the simulated environment.

Notably, the term "first sequence of processed images" refers to images that are to be used to generate display images corresponding to the region of interest of the given image or the part of the region of interest and the term "second sequence of processed images" refers to images that are to be used to generate display images corresponding to at least the region of the given image that includes and surrounds the region of interest. It will be appreciated that the first sequence of processed images comprises at least one first processed image whereas the second sequence of processed images comprises at least one second processed image.

Optionally, the processing unit of the display apparatus is configured to process the first sequence of processed images and the second sequence of processed images to generate a first sequence of display images and a second sequence of display images, respectively, wherein the first sequence of display images is to be rendered at the first image renderer and the second sequence of display images is to be rendered at the second image renderer.

Throughout the present disclosure, the term "first image renderer" used herein relates to equipment that, in operation, renders the first sequence of display images. Similarly, the term "second image renderer" used herein relates to equipment that, in operation, renders the second sequence of display images.

The term "region of interest" refers to a region of given image towards which the gaze direction of the user is directed (namely, focused). Optionally, the processor utilizes the information indicative of the gaze direction of the user, to determine the region of interest of the given image. In such a case, the processor maps the gaze direction of the user to the given image to identify the region of interest.

Furthermore, optionally, the processor is configured to crop the given image, based on the region of interest of the given image, to generate the first processed image. Optionally, in this regard, the given image is cropped according to a shape of the region of interest of the given image. As an example, the gaze direction of the user corresponding to a given image of a real-world beach environment may be detected to be towards a round ball lying on the beach. In such an instance, a region of interest of the given image may be determined to be a circular shaped region including the ball. Therefore, in such an instance, the processor may crop the image of the real-world beach environment to a predefined shape, for example, such as a circle, while generating the first processed image that represents the region of interest.

Furthermore, optionally, the processor is configured to crop the given image to generate the second processed image. Optionally, the processor crops the given image in a manner that the second processed image represents at least the region of the given image that includes and surrounds the region of interest.

Additionally, optionally, the processor is configured to employ at least one image processing algorithm while generating the first processed image and/or the second processed image. Optionally, the at least one image processing algorithm is at least one of: a sharpening algorithm, a blurring algorithm, an image straightening algorithm, a colour adjustment algorithm, a tonal adjustment algorithm.

The angular size of the field of view represented by the first processed image is optionally larger than the angular size of the field of view providable by the first image renderer. Likewise, the angular size of the field of view represented by the second processed image is optionally larger than the angular size of the field of view providable by the second image renderer. It will be appreciated that such angular sizes of the fields of view represented by the first and second processed images allow for accommodating small head movements of the user at the display apparatus.

Optionally, the resolution of the second processed image is lower than the resolution of the first processed image. Therefore, a number of bytes required to communicate (namely, deliver) the second processed image is reduced greatly. It will be appreciated that since the resolution of the second processed image is lower than the resolution of the first processed image, a resolution of a second display image generated from the second processed image is lower than a resolution of a first display image generated from the first processed image.

The present disclosure also relates to the method as described above. Various embodiments and variants disclosed above apply mutatis mutandis to the method.

Optionally, in the method, the at least one image source is implemented as a data repository at which a plurality of images are stored, and wherein a given image from amongst the plurality of images is:
previously captured by a camera,
previously generated using computer graphics, or
previously captured by a camera and further processed using computer graphics.

Optionally, in the method, the at least one image source is implemented as at least one camera, and the method further comprises:

obtaining information indicative of a head orientation of the user;
determining a change in the head orientation of the user relative to a previous head orientation of the user;
selecting adaptively a framerate to be employed for the at least one camera based on the change in the head orientation of the user; and
adjusting a three-dimensional orientation of the at least one camera, based on the head orientation of the user, and employing the selected framerate to capture the sequence of images, the sequence of images being representative of a real-world environment.

Optionally, in the method, the step of cropping the given image comprises:
selecting a size of an area to be cropped out from the given image, based on a rate at which the head orientation of the user has changed; and/or
selecting a location of an area to be cropped out from the given image, based on a direction in which the head orientation of the user has changed relative to the previous head orientation.

Optionally, the method further comprises adjusting an exposure time of the at least one camera based on the selected framerate.

Optionally, the method further comprises:
processing the sequence of images to detect motion in a visual scene represented by the sequence of images; and
selecting adaptively a next framerate to be employed for the at least one camera, based on the motion detected in the visual scene and a next change in the head orientation of the user, to capture a next sequence of images of the real-world environment.

Optionally, in the method, the at least one image renderer comprises a first image renderer and a second image renderer, and the at least one sequence of processed images comprises a first sequence of processed images and a second sequence of processed images, wherein the step of processing the sequence of images comprises:
determining a region of interest of a given image, based on the gaze direction of the user;
generating a first processed image corresponding to the region of interest of the given image or a part of the region of interest, wherein an angular size of a field of view represented by the first processed image is larger than an angular size of a field of view providable by the first image renderer of the display apparatus; and
generating a second processed image corresponding to at least a region of the given image that includes and surrounds the region of interest, wherein an angular size of a field of view represented by the second processed image is larger than an angular size of a field of view providable by the second image renderer of the display apparatus, and wherein a resolution of the second processed image is lower than a resolution of the first processed image.

The present disclosure also relates to the computer program product as described above. Various embodiments and variants disclosed above apply mutatis mutandis to the computer program product.

Optionally, in the computer program product, the at least one image source is implemented as a data repository at which a plurality of images are stored, wherein a given image from amongst the plurality of images is:
previously captured by a camera,
previously generated using computer graphics, or
previously captured by a camera and further processed using computer graphics.

Optionally, in the computer program product, the at least one image source is implemented as at least one camera, and the program instructions further cause the processing device to:

obtain information indicative of a head orientation of the user;

determine a change in the head orientation of the user relative to a previous head orientation of the user;

select adaptively a framerate to be employed for the at least one camera based on the change in the head orientation of the user; and adjust a three-dimensional orientation of the at least one camera, based on the head orientation of the user, and employ the selected framerate to capture the sequence of images, the sequence of images being representative of a real-world environment.

Optionally, in the computer program product, when cropping the given image, the program instructions cause the processing device to:

select a size of an area to be cropped out from the given image, based on a rate at which the head orientation of the user has changed; and/or select a location of an area to be cropped out from the given image, based on a direction in which the head orientation of the user has changed relative to the previous head orientation.

Optionally, in the computer program product, when accessed by the processing device, the program instructions cause the processing device to adjust an exposure time of the at least one camera based on the selected framerate.

Optionally, in the computer program product, when accessed by the processing device, the program instructions cause the processing device to:

process the sequence of images to detect motion in a visual scene represented by the sequence of images; and select adaptively a next framerate to be employed for the at least one camera, based on the motion detected in the visual scene and a next change in the head orientation of the user, to capture a next sequence of images of the real-world environment.

Optionally, in the computer program product, the at least one image renderer comprises a first image renderer and a second image renderer, and the at least one sequence of processed images comprises a first sequence of processed images and a second sequence of processed images, wherein, when processing the sequence of images, the program instructions cause the processing device to:

determine a region of interest of a given image, based on the gaze direction of the user;

generate a first processed image corresponding to the region of interest of the given image or a part of the region of interest, wherein an angular size of a field of view represented by the first processed image is larger than an angular size of a field of view providable by the first image renderer of the display apparatus; and generate a second processed image corresponding to at least a region of the given image that includes and surrounds the region of interest, wherein an angular size of a field of view represented by the second processed image is larger than an angular size of a field of view providable by the second image renderer of the display apparatus, and wherein a resolution of the second processed image is lower than a resolution of the first processed image.

DETAILED DESCRIPTION OF THE DRAWINGS

Figure 1:
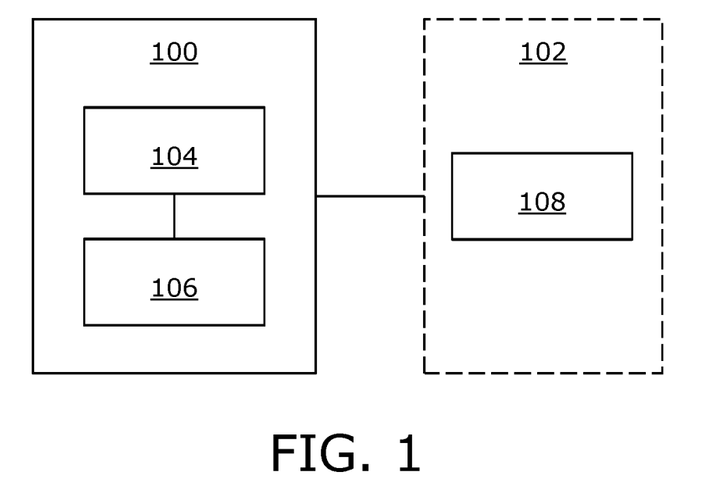
FIGS. 1 and 2 illustrate block diagrams of architectures of a system for producing images for a display apparatus, in accordance with different embodiments of the present disclosure.

Referring to FIG. 1, illustrated is a block diagram of architecture of a system 100 for producing images for a display apparatus 102, in accordance with an embodiment of the present disclosure. The system 100 comprises at least one image source (depicted as an image source 104) and a processor 106 communicably coupled to the image source 104. The processor 106 is configured to:

obtain information indicative of an angular size of a field of view providable by at least one image renderer (depicted as an image renderer 108) of the display apparatus 102;

obtain information indicative of a gaze direction of a user;

receive a sequence of images from the image source 104; and process the sequence of images to generate at least one sequence of processed images to be communicated to the display apparatus 102, wherein, when processing the sequence of images, the processor 106 is configured to crop a given image, based on the gaze direction of the user and the angular size of the field of view providable by the image renderer 108, to generate at least one processed image, an angular size of a field of view represented by the at least one processed image being larger than the angular size of the field of view providable by the image renderer 108 of the display apparatus 102.

Figure 2:
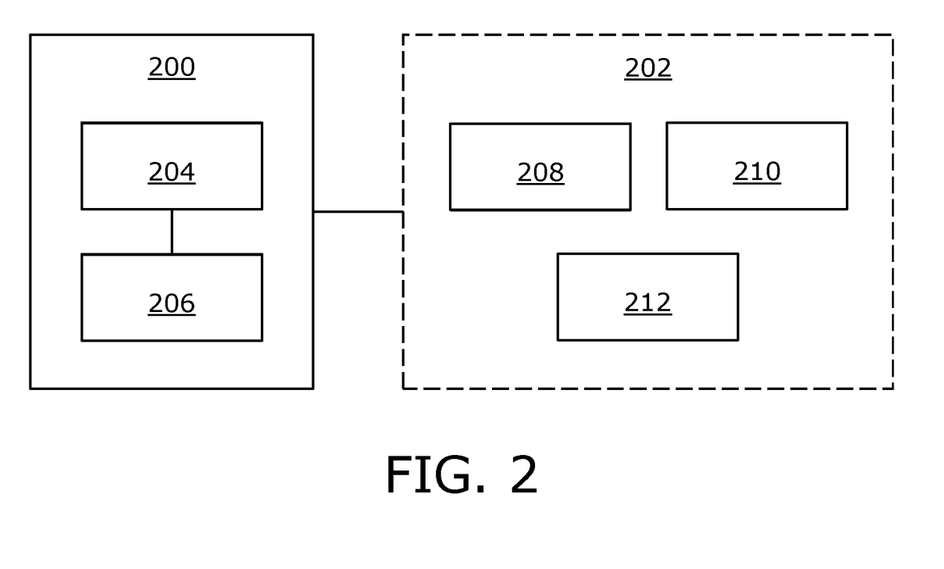

Referring to FIG. 2, illustrated is a block diagram of architecture of a system 200 for producing images for a display apparatus 202, in accordance with an embodiment of the present disclosure. The system 200 comprises at least one image source (depicted as an image source 204) and a processor 206 communicably coupled to the image source 204. The processor 206 generates at least one sequence of processed images to be communicated to the display apparatus 202. At least one image renderer of the display apparatus 202 comprises a first image renderer 208 and a second image renderer 210. The at least one sequence of processed images comprises a first sequence of processed images and a second sequence of processed images, wherein, when processing a sequence of images to generate the at least one sequence of processed images, the processor 206 is configured to:

determine a region of interest of a given image, based on a gaze direction of a user;

generate a first processed image corresponding to the region of interest of the given image or a part of the region of interest, wherein an angular size of a field of view represented by the first processed image is larger than an angular size of a field of view providable by the first image renderer 208 of the display apparatus 202; and generate a second processed image corresponding to at least a region of the given image that includes and surrounds the region of interest, wherein an angular size of a field of view represented by the second processed image is larger than an angular size of a field of view providable by the second image renderer 210 of the display apparatus 202, and wherein a resolution of the second processed image is lower than a resolution of the first processed image.

Notably, information indicative of the gaze direction of the user is obtained by the system 200 from the display apparatus 202. The display apparatus 202 comprises a means 212 for detecting the gaze direction.

It may be understood by a person skilled in the art that FIG. 1 and FIG. 2 depict simplified block diagrams of architectures of the systems 100 and 200, respectively, for sake of clarity, which should not unduly limit the scope of the claims herein. The person skilled in the art will recognize many variations, alternatives, and modifications of embodiments of the present disclosure.

Figure 3:
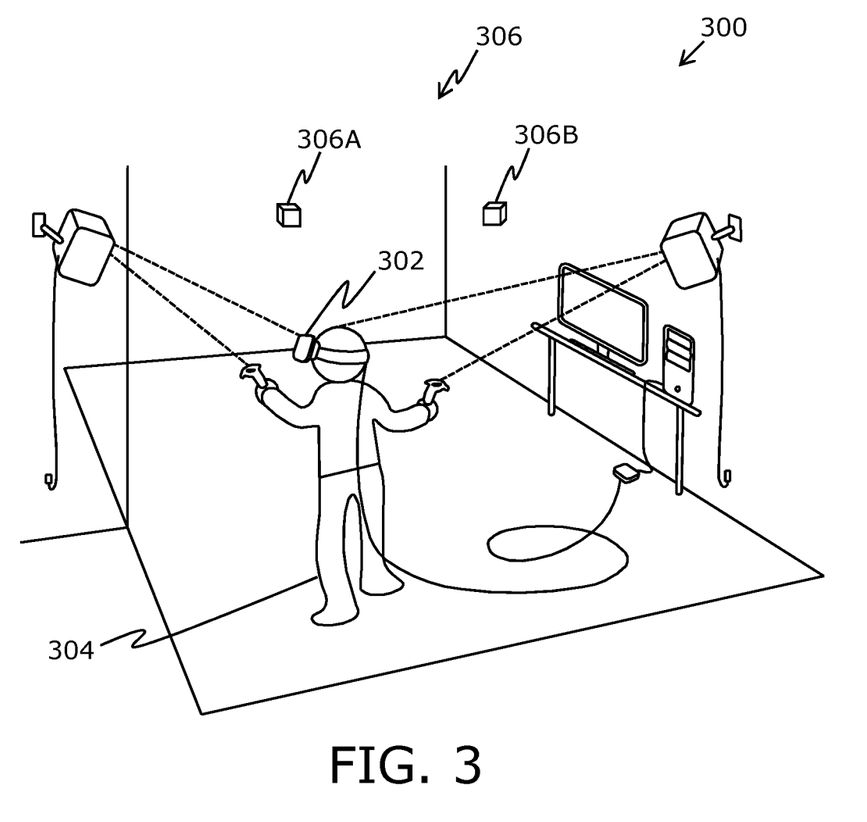
FIG. 3 illustrates is a schematic illustration of an environment for using a system for producing images for a display apparatus, in accordance with an embodiment of the present disclosure.

Referring to FIG. 3, illustrated is a schematic illustration of an environment 300 for using a system (not shown) for producing images for a display apparatus 302, in accordance with an embodiment of the present disclosure. The environment 300 includes a user 304 wearing the display apparatus 302 on his/her head. The system comprises at least one image source (not shown) and a processor (not shown) communicably coupled to the image source. In the environment 300, information indicative of a gaze direction of the user is obtained by the processor using an external gaze tracking system 306 that monitors markers attached to the display apparatus 302. The external gaze tracking system 306 comprises at least one marker monitoring module (depicted as marker monitoring modules 306A and 306B).

FIG. 3 is merely an example, which should not unduly limit the scope of the claims herein. A person skilled in the art will recognize many variations, alternatives, and modifications of embodiments of the present disclosure.

Figure 4A:
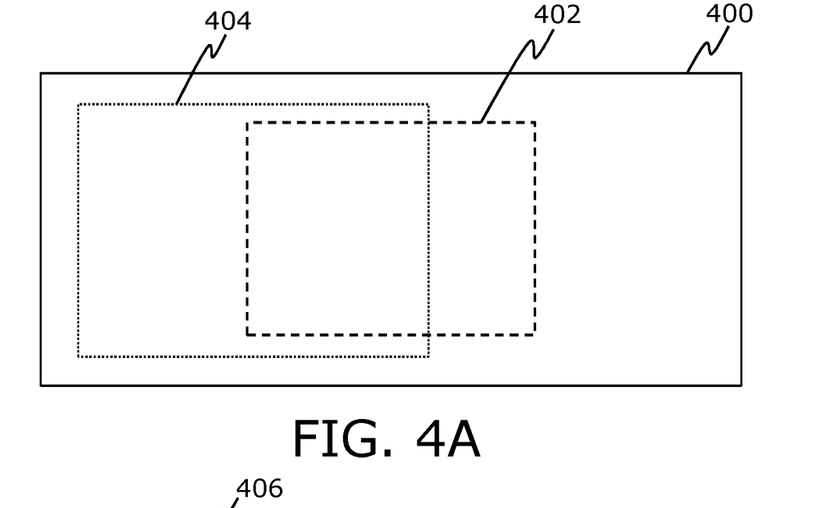
FIG. 4A illustrates a captured image of a real-world environment, in accordance with an embodiment of the present disclosure.

Referring to FIG. 4A, illustrated is a captured image 400 of a real-world environment, in accordance with an embodiment of the present disclosure. The image 400 is captured by at least one camera (not shown) that is used to implement at least one image source of a system for producing images for a display apparatus. When processing the captured image 400, a processor (not shown) of the system (not shown) crops the captured image 400 based on a gaze direction of a user and an angular size of a field of view providable by at least one image renderer (not shown) of the display apparatus (not shown). In one instance, the gaze direction of the user may be directed towards a central region 402 of the captured image 400. In another instance, the gaze direction of the user may be directed towards a left region 404 of the captured image 400.

Figure 4B:
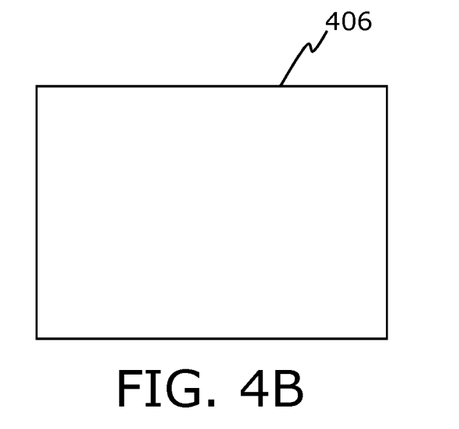
FIG. 4B illustrates a processed image generated from the captured image of FIG. 4A.

Referring to FIG. 4B, illustrated is a processed image 406 generated from the captured image 400 of FIG. 4A, in accordance with an embodiment of the present disclosure. Notably, when the gaze direction of the user is directed towards the left region 404 of the given captured image 400, the processor is configured to crop a left area of the captured image 400 (depicted as a dotted-outlined area within the captured image 400) to generate the processed image 406. Notably, a location of the left area to be cropped out from the captured image 400 is offset with respect to the captured image 400.

Figure 4C:
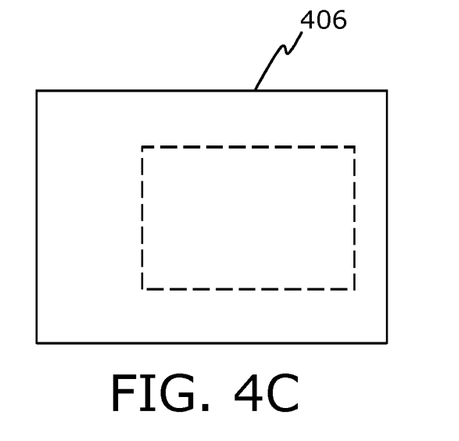
FIG. 4C illustrates how the processed image of FIG. 4B is to be processed for use in a display apparatus, in accordance with an embodiment of the present disclosure.

Referring to FIG. 4C, illustrated is how the processed image 406 of FIG. 4B is to be processed for use in the display apparatus, in accordance with an embodiment of the present disclosure. A processing unit (not shown) of the display apparatus, based on the gaze direction of the user and the angular size of the field of view providable by the at least one image renderer, crops the processed image 406 to generate a display image. An exemplary portion of the processed image 406 to be cropped is depicted by a long-dashed box within the processed image 406, said portion of the processed image 406 being offset with respect to the processed image.

Figure 4D:
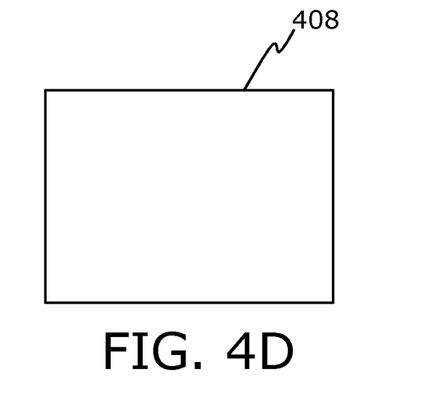
FIG. 4D illustrates a processed image generated from the captured image of FIG. 4A.

Referring to FIG. 4D, illustrated is a processed image 408 generated from the captured image 400 of FIG. 4A, in accordance with another embodiment of the present disclosure. Notably, when the gaze direction of the user is directed towards the central region 402 of the captured image 400, the processor is configured to crop a central area of the captured image 400 (depicted as a dashed-outlined area within the captured image 400) to generate the processed image 408. Notably, a location of the central area to be cropped out from the captured image 400 is concentric with respect to the captured image 400.

Figure 4E:
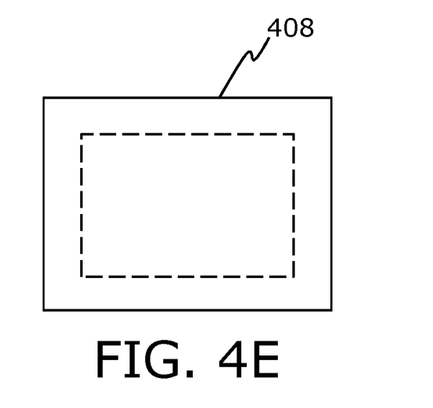
FIG. 4E illustrates how the processed image of FIG. 4D is to be processed for use in a display apparatus, in accordance with another embodiment of the present disclosure.

Referring to FIG. 4E, illustrated is how the processed image 408 of FIG. 4D is to be processed for use in the display apparatus, in accordance with another embodiment of the present disclosure. A processing unit (not shown) of the display apparatus, based on the gaze direction of the user and the angular size of the field of view providable by the at least one image renderer, crops the processed image 408 to generate a display image. An exemplary portion of the processed image 408 to be cropped is depicted by a long-dashed box within the processed image 408, said portion of the processed image 408 being concentric with respect to the processed image.

FIGS. 4A, 4B, 4C, 4D and 4E are merely examples, which should not unduly limit the scope of the claims herein. A person skilled in the art will recognize many variations, alternatives, and modifications of embodiments of the present disclosure.

Figure 5:
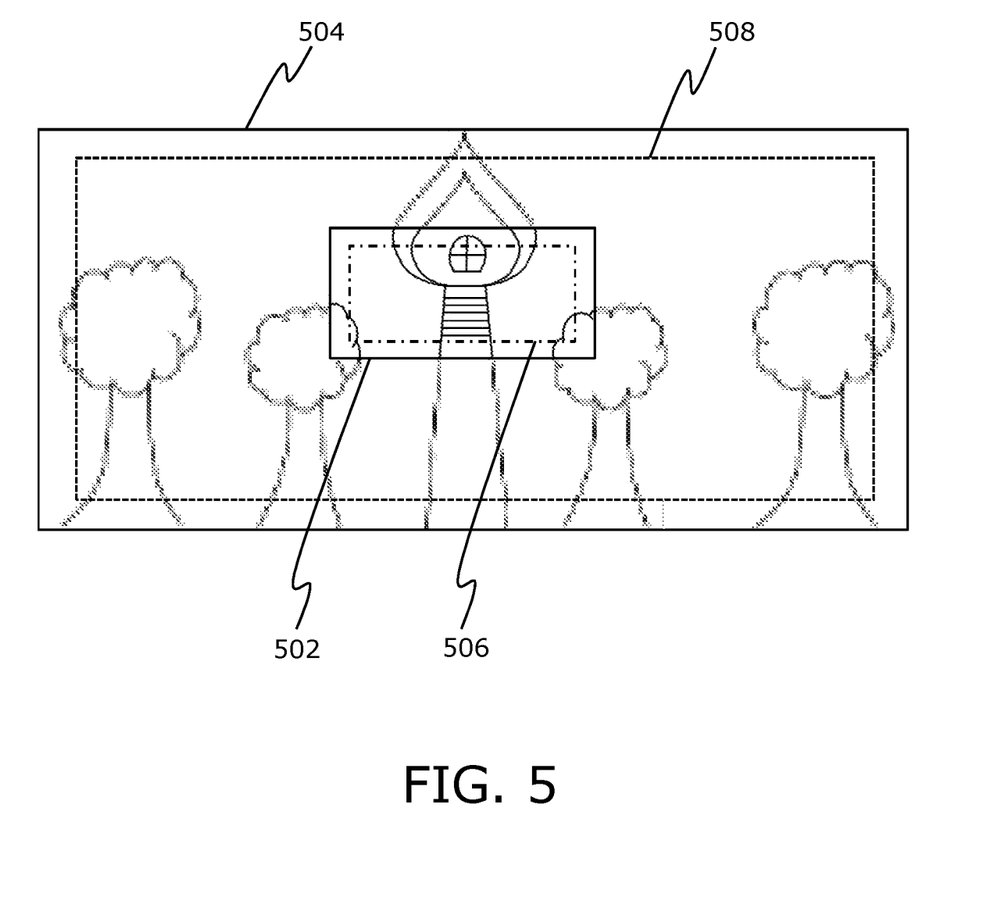
FIG. 5 illustrates a first processed image and a second processed image, in accordance with an embodiment of the present disclosure.

Referring to FIG. 5, illustrated is a first processed image 502 and a second processed image 504, in accordance with an embodiment of the present disclosure. The first processed image 502 corresponds to a region of interest of a given image, whereas the second processed image 504 corresponds to a region of the given image that includes and surrounds the region of interest. A resolution of the second processed image 504 is lower than a resolution of the first processed image 502. A processing unit (not shown) of a display apparatus (not shown) is configured to crop the first processed image 502 and the second processed image 504, based on an angular size of a field of view providable by a first image renderer (not shown) and a second image renderer (not shown) of the display apparatus, respectively. Notably, a cropped portion of the first processed image 502 to be rendered at the first image renderer is referred to as a first display image 506 (depicted as a dashed-dot region within the first processed image 502) and a cropped portion of the second processed image 504 to be rendered at the second image renderer is referred to as a second display image 508 (depicted as a dotted region within the second processed image 504).

FIG. 5 is merely an example, which should not unduly limit the scope of the claims herein. A person skilled in the art will recognize many variations, alternatives, and modifications of embodiments of the present disclosure.

Figure 6:
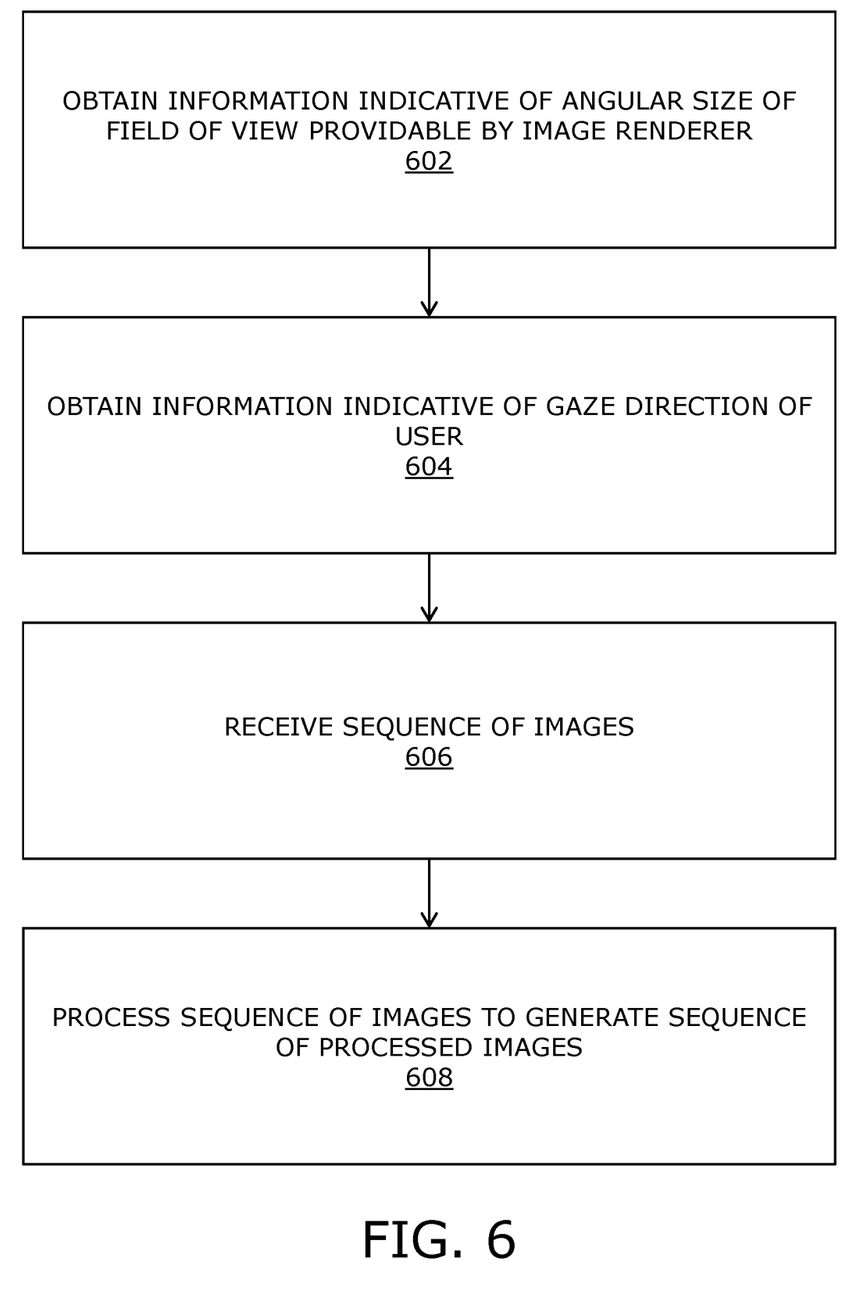
FIG. 6 illustrates steps of a method of producing images for a display apparatus, in accordance with an embodiment of the present disclosure.

Referring to FIG. 6, illustrated are steps of a method of producing images for a display apparatus, in accordance with an embodiment of the present disclosure. At a step 602, information indicative of an angular size of a field of view providable by at least one image renderer of the display apparatus is obtained. At a step 604, information indicative of a gaze direction of a user is obtained. At a step 606, a sequence of images is received from at least one image source. At a step 608, the sequence of images is processed to generate at least one sequence of processed images to be communicated to the display apparatus, wherein the step of processing the sequence of images comprises cropping a given image, based on the gaze direction of the user and the angular size of the field of view providable by the at least one image renderer, to generate at least one processed image. An angular size of a field of view represented by the at least one processed image is larger than the angular size of the field of view providable by the at least one image renderer of the display apparatus.

The steps 602 to 608 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for producing images for a display apparatus, the system comprising at least one image source, and a processor communicably coupled to the at least one image source, wherein the processor is configured to:
    obtain information indicative of an angular size of a field of view providable by at least one image renderer of the display apparatus;
    obtain information indicative of a gaze direction of a user;
    receive a sequence of images from the at least one image source; and
    process the sequence of images to generate at least one sequence of processed images to be communicated to the display apparatus, wherein, when processing the sequence of images, the processor is configured to crop a given image, based on the gaze direction of the user and the angular size of the field of view providable by the at least one image renderer, to generate at least one processed image, an angular size of a field of view represented by the at least one processed image being larger than the angular size of the field of view providable by the at least one image renderer of the display apparatus,
    wherein the at least one image source is implemented as at least one camera, and the processor is further configured to:
        obtain information indicative of a head orientation of the user;
        determine a change in the head orientation of the user relative to a previous head orientation of the user;
        select adaptively a framerate to be employed for the at least one camera based on the change in the head orientation of the user; and
        adjust a three-dimensional orientation of the at least one camera, based on the head orientation of the user, and employ the selected framerate to capture the sequence of images, the sequence of images being representative of a real-world environment.

2. The system of claim 1, wherein the at least one image source is implemented as a data repository at which a plurality of images are stored, wherein a given image from amongst the plurality of images is:
    previously captured by a camera,
    previously generated using computer graphics, or
    previously captured by a camera and further processed using computer graphics.

3. The system of claim 1, wherein, when cropping the given image, the processor is configured to:
    select a size of an area to be cropped out from the given image, based on a rate at which the head orientation of the user has changed; and/or
    select a location of an area to be cropped out from the given image, based on a direction in which the head orientation of the user has changed relative to the previous head orientation.

4. The system of claim 1, wherein the processor is configured to adjust an exposure time of the at least one camera based on the selected framerate.

5. The system of claim 1, wherein the processor is configured to:
    process the sequence of images to detect motion in a visual scene represented by the sequence of images; and
    select adaptively a next framerate to be employed for the at least one camera, based on the motion detected in the visual scene and a next change in the head orientation of the user, to capture a next sequence of images of the real-world environment.

6. The system of claim 1, wherein the at least one image renderer comprises a first image renderer and a second image renderer, and the at least one sequence of processed images comprises a first sequence of processed images and a second sequence of processed images, wherein, when processing the sequence of images, the processor is configured to:
    determine a region of interest of a given image, based on the gaze direction of the user;
    generate a first processed image corresponding to the region of interest of the given image or a part of the region of interest, wherein an angular size of a field of view represented by the first processed image is larger than an angular size of a field of view providable by the first image renderer of the display apparatus; and
    generate a second processed image corresponding to at least a region of the given image that includes and surrounds the region of interest, wherein an angular size of a field of view represented by the second processed image is larger than an angular size of a field of view providable by the second image renderer of the display apparatus, and wherein a resolution of the second processed image is lower than a resolution of the first processed image.

7. A method of producing images for a display apparatus, the method comprising:
    obtaining information indicative of an angular size of a field of view providable by at least one image renderer of the display apparatus;
    obtaining information indicative of a gaze direction of a user;
    receiving a sequence of images from at least one image source; and
    processing the sequence of images to generate at least one sequence of processed images to be communicated to the display apparatus, wherein the step of processing the sequence of images comprises cropping a given image, based on the gaze direction of the user and the angular size of the field of view providable by the at least one image renderer, to generate at least one processed image, an angular size of a field of view represented by the at least one processed image being larger than the angular size of the field of view providable by the at least one image renderer of the display apparatus,
    wherein the at least one image source is implemented as at least one camera, and the method further comprises:
        obtaining information indicative of a head orientation of the user;
        determining a change in the head orientation of the user relative to a previous head orientation of the user;
        selecting adaptively a framerate to be employed for the at least one camera based on the change in the head orientation of the user; and
        adjusting a three-dimensional orientation of the at least one camera, based on the head orientation of the user, and employing the selected framerate to capture the sequence of images, the sequence of images being representative of a real-world environment.

8. The method of claim 7, wherein the at least one image source is implemented as a data repository at which a plurality of images are stored, and wherein a given image from amongst the plurality of images is:
   previously captured by a camera,
   previously generated using computer graphics, or
   previously captured by a camera and further processed using computer graphics.

9. The method of claim 7, wherein the step of cropping the given image comprises:
   selecting a size of an area to be cropped out from the given image, based on a rate at which the head orientation of the user has changed; and/or
   selecting a location of an area to be cropped out from the given image, based on a direction in which the head orientation of the user has changed relative to the previous head orientation.

10. The method of claim 7, further comprising adjusting an exposure time of the at least one camera based on the selected framerate.

11. The method of claim 7, further comprising:
    processing the sequence of images to detect motion in a visual scene represented by the sequence of images; and
    selecting adaptively a next framerate to be employed for the at least one camera, based on the motion detected in the visual scene and a next change in the head orientation of the user, to capture a next sequence of images of the real-world environment.

12. The method of claim 7, wherein the at least one image renderer comprises a first image renderer and a second image renderer, and the at least one sequence of processed images comprises a first sequence of processed images and a second sequence of processed images, wherein the step of processing the sequence of images comprises:
    determining a region of interest of a given image, based on the gaze direction of the user;
    generating a first processed image corresponding to the region of interest of the given image or a part of the region of interest, wherein an angular size of a field of view represented by the first processed image is larger than an angular size of a field of view providable by the first image renderer of the display apparatus; and
    generating a second processed image corresponding to at least a region of the given image that includes and surrounds the region of interest, wherein an angular size of a field of view represented by the second processed image is larger than an angular size of a field of view providable by the second image renderer of the display apparatus, and wherein a resolution of the second processed image is lower than a resolution of the first processed image.

13. A computer program product comprising a non-transitory machine-readable data storage medium having stored thereon program instructions that, when accessed by a processing device, cause the processing device to:
    obtain information indicative of an angular size of a field of view providable by at least one image renderer of a display apparatus;
    obtain information indicative of a gaze direction of a user;
    receive a sequence of images from at least one image source; and
    process the sequence of images to generate at least one sequence of processed images to be communicated to the display apparatus, wherein, when processing the sequence of images, the program instructions cause the processing device to crop a given image, based on the gaze direction of the user and the angular size of the field of view providable by the at least one image renderer, to generate at least one processed image, an angular size of a field of view represented by the at least one processed image being larger than the angular size of the field of view providable by the at least one image renderer of the display apparatus,
    wherein the at least one image source is implemented as at least one camera, and the program instructions further cause the processing device to:
       obtain information indicative of a head orientation of the user;
       determine a change in the head orientation of the user relative to a previous head orientation of the user;
       select adaptively a framerate to be employed for the at least one camera based on the change in the head orientation of the user; and
       adjust a three-dimensional orientation of the at least one camera, based on the head orientation of the user, and employ the selected framerate to capture the sequence of images, the sequence of images being representative of a real-world environment.

14. The computer program product of claim 13, wherein the at least one image source is implemented as a data repository at which a plurality of images are stored, wherein a given image from amongst the plurality of images is:
    previously captured by a camera,
    previously generated using computer graphics, or
    previously captured by a camera and further processed using computer graphics.

15. The computer program product of claim 13, wherein, when cropping the given image, the program instructions cause the processing device to:
    select a size of an area to be cropped out from the given image, based on a rate at which the head orientation of the user has changed; and/or
    select a location of an area to be cropped out from the given image, based on a direction in which the head orientation of the user has changed relative to the previous head orientation.

16. The computer program product of claim 13, wherein, when accessed by the processing device, the program instructions cause the processing device to adjust an exposure time of the at least one camera based on the selected framerate.

17. The computer program product of claim 13, wherein, when accessed by the processing device, the program instructions cause the processing device to:
    process the sequence of images to detect motion in a visual scene represented by the sequence of images; and
    select adaptively a next framerate to be employed for the at least one camera, based on the motion detected in the visual scene and a next change in the head orientation of the user, to capture a next sequence of images of the real-world environment.

18. The computer program product of claim 13, wherein the at least one image renderer comprises a first image renderer and a second image renderer, and the at least one sequence of processed images comprises a first sequence of processed images and a second sequence of processed images, wherein, when processing the sequence of images, the program instructions cause the processing device to:
    determine a region of interest of a given image, based on the gaze direction of the user;

generate a first processed image corresponding to the region of interest of the given image or a part of the region of interest, wherein an angular size of a field of view represented by the first processed image is larger than an angular size of a field of view providable by the first image renderer of the display apparatus; and generate a second processed image corresponding to at least a region of the given image that includes and surrounds the region of interest, wherein an angular size of a field of view represented by the second processed image is larger than an angular size of a field of view providable by the second image renderer of the display apparatus, and wherein a resolution of the second processed image is lower than a resolution of the first processed image.

* * * * *